UNITED STATES PATENT OFFICE.

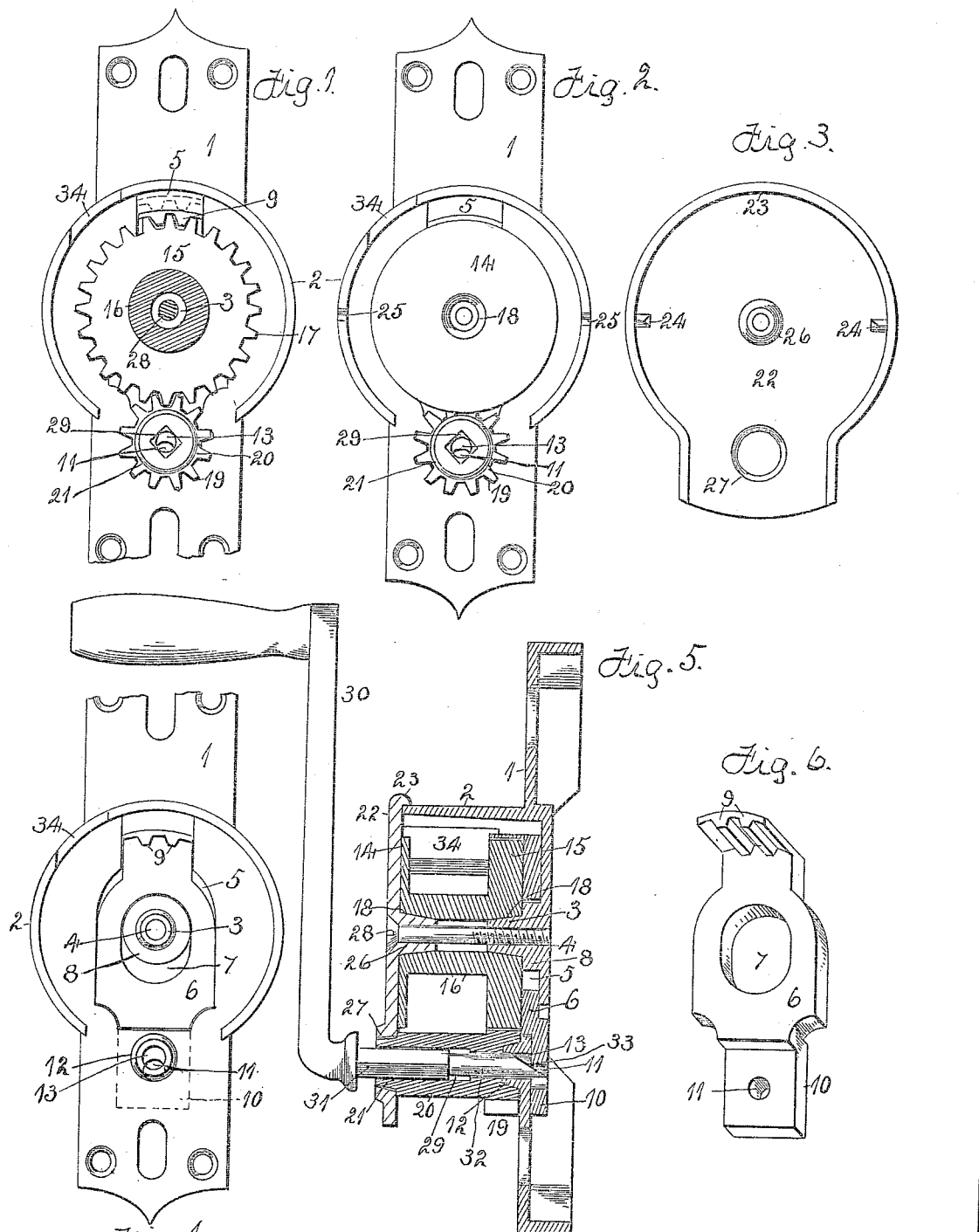

JAMES W. MANARD, OF ROCKFORD, ILLINOIS.

AWNING-LIFT.

953,852. Specification of Letters Patent. Patented Apr. 5, 1910.

Application filed June 27, 1908. Serial No. 440,750.

*To all whom it may concern:*

Be it known that I, JAMES W. MANARD, a citizen of the United States, residing at Rockford, in the county of Winnebago and State of Illinois, have invented certain new and useful Improvements in Awning-Lifts, of which the following is a specification.

The object of this invention is to construct a simple and efficient awning lift.

In the accompanying drawings, Figure 1 is a face representation of the lift with the cap removed and the pinion shown in section. Fig. 2 is a face representation of the lift in which the cap has been removed. Fig. 3 is an inner face view of the cap. Fig. 4 is a face representation in which the cap, reel and pinion are removed. Fig. 5 is a vertical section. Fig. 6 is a perspective view of the sliding dog.

The base plate 1 has a sectional rim 2 extending from it. A conical stud 3 extends from the base plate and has a central opening 4. The base plate 1 has a cut away central portion 5 within which is located a slidable dog 6 having a central opening 7 which receives the enlargement 8 located around the stud 3. This dog has an upturned end formed with teeth 9, and the other end 10 is offset and is provided with a hole 11. The offset portion 10 of the dog extends beneath the base plate as shown in section in Fig. 5. The base plate 1 has a conical stud 12 which has a hole 13 of the size of the hole 11 in the dog, and as the dog is moved in one direction the hole 11 will partially cover the hole 13 in the base plate, and when moved in the other direction the holes will coincide. A reel is composed of the heads 14 and 15 connected by a central tubular spool 16. The head 15 is formed with peripheral teeth 17 forming a spur gear. The ends 18 of the central spool are formed with conical openings. A toothed-pinion 19 is formed in connection with the tubular shaft 20, the upper end 21 of which is conical.

A cap 22 has an overturned edge 23 that is fitted to receive the open end of the sectional rim 2. V shaped projections 24 fit corresponding notches 25 in the edge of the rim which prevents the axial displacement of the cap. The underface of the cap is provided with a tubular conical projection 26, and this cap is also provided with a conical opening 27. The reel is placed in connection with the conical stud 3 and the toothed-pinion is supported by the conical stud 12.

The cap 22 is then placed over the rim 2 so that its conical projection 26 will enter the end opening 18 of the reel. The conical opening 27 receives the conical end 21 of the shaft 20, and a screw 28 connects the cap with the rim 2 by its screw-threaded end turned in connection with the screw threaded opening 4 of the stud 3. The opening 29 in the shaft 20 is angular in cross section a part of its length, and circular the remainder of its length.

A crank 30 has a shank with an angular section 31, and a round section 32 which is formed with a beveled end 33. The weight of the dog will hold the teeth 9 thereof in engagement with the teeth of the spur gear 17 as shown at Fig. 1, which will hold the reel from rotation. In placing the shank of the handle in the opening 29 in the shaft 20 of the pinion 19, the beveled end thereof will enter the hole 11 in the dog 6 and when the shank is fully entered, its beveled end will have fully passed through the hole 11 which will raise the dog and carry the teeth 9 thereof free of the spur gear 17, which will leave the reel and pinion 19 free to rotate, which is accomplished by the angular section 31 of the shank turning the pinion 19. Upon the withdrawal of the shank of the crank from the pinion 19 the dog 6 will drop so that its teeth 9 will again engage the teeth of the spur gear 17. The reel cannot be turned until the shank of the crank has released the dog. The opening 34 in the rim permits a rope to connect with the reel and be wound thereupon. The conical supports for the reel and toothed-pinion save expense, simplify and cheapen the construction.

I claim as my invention.

1. An awning lift comprising a base plate, a toothed reel located in connection with the base plate, a toothed pinion in engagement with the reel, a dog holding the reel against movement, the pinion provided with an angular opening and the dog provided with a round opening, a crank having angular and round sections, the round section having a tapered end so that upon the insertion of the shank in the opening of the pinion its tapered end will enter the opening in the dog and raise the dog free of the reel.

2. An awning lift comprising a base plate having a rim extending therefrom, a cap for the rim, a reel located within the rim and having a toothed head, a toothed pinion meshing with the teeth of the reel and held in position by the cap in connection with the base plate, and a dog holding the reel against movement.

3. An awning lift comprising a base plate having a rim extending therefrom, a cap for the rim having a depending flange, and two projections adapted to engage the rim, a reel located between the base plate and cap and provided with conical recesses which receive conical projections extending from the base plate and cap, one of the heads of the reel being in toothed form, a toothed pinion supported by the plate and cap, and a dog holding the reel against movement.

In testimony whereof I have hereunto set my hand in presence of two subscribing witnesses.

JAMES W. MANARD.

Witnesses:
A. O. BEHEL,
E. D. E. N. BEHEL.